United States Patent
Nakayama et al.

(10) Patent No.: US 9,947,971 B2
(45) Date of Patent: Apr. 17, 2018

(54) BATTERY SYSTEM (71) Applicant: TOYOTA JIDOSHA KABUSHIKI KAISHA, Toyota-shi, Aichi-ken (JP)

(72) Inventors: Hiroyuki Nakayama, Okazaki (JP); Makoto Nakashima, Toyota (JP); Masato Komatsuki, Hashima-gun (JP); Yasuhide Kurimoto, Kasugai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 270 days.

(21) Appl. No.: 14/611,422

(22) Filed: Feb. 2, 2015

(65) Prior Publication Data

US 2015/0236384 A1 Aug. 20, 2015

(30) Foreign Application Priority Data

Feb. 17, 2014 (JP) ................................. 2014-027562

(51) Int. Cl.
*H01M 10/48* (2006.01)
*H01M 10/052* (2010.01)
(Continued)

(52) U.S. Cl.
CPC ............... *H01M 10/48* (2013.01); *B60L 3/04* (2013.01); *B60L 3/12* (2013.01); *B60L 7/14* (2013.01); *B60L 11/123* (2013.01); *B60L 11/14* (2013.01); *B60L 11/1861* (2013.01); *B60L 11/1864* (2013.01); *B60L 15/2009* (2013.01); *H01M 10/052* (2013.01); *H01M 10/486* (2013.01); *B60L 2210/10* (2013.01); *B60L 2210/40* (2013.01); *B60L 2240/12* (2013.01); *B60L 2240/545* (2013.01); *B60L 2240/547* (2013.01); *B60L 2240/549* (2013.01); *B60L 2240/80* (2013.01); *B60L 2250/16* (2013.01); *B60L 2260/44* (2013.01); *H01M 10/488* (2013.01); *H01M 2220/20* (2013.01); *H02J 7/0021* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/7216* (2013.01); *Y02T 10/7241* (2013.01); *Y02T 10/7275* (2013.01)

(58) Field of Classification Search
CPC .................................................... H01M 10/488
See application file for complete search history.

(56) References Cited

U.S. PATENT DOCUMENTS 6,296,967 B1 10/2001 Jacobs et al.
2001/0022518 A1 9/2001 Asakura et al.
(Continued)

FOREIGN PATENT DOCUMENTS

DE 10 110 642 A1 10/2001
DE 10 2012 205 136 A1 10/2013
(Continued)

OTHER PUBLICATIONS

Merriam-Webster.*
Trans.Of.JP2006250905.*

*Primary Examiner* — Sarah A. Slifka
*Assistant Examiner* — Brian R Ohara
(74) *Attorney, Agent, or Firm* — Sughrue Mion, PLLC (57) ABSTRACT

A battery capacity estimation unit estimates a battery in battery capacity based on information regarding the battery's use history. A moisture intrusion estimation unit estimates an amount of moisture intruding into the battery. A battery capacity correction unit uses the estimated amount of intruding moisture to correct the estimated battery capacity.

7 Claims, 5 Drawing Sheets

(51) Int. Cl.
*H02J 7/00* (2006.01)
*B60L 3/04* (2006.01)
*B60L 3/12* (2006.01)
*B60L 7/14* (2006.01)
*B60L 11/12* (2006.01)
*B60L 11/14* (2006.01)
*B60L 11/18* (2006.01)
*B60L 15/20* (2006.01)

(56) References Cited

U.S. PATENT DOCUMENTS

2003/0052646 A1* 3/2003 Minamiura ............ B60L 3/0023
 320/122
2012/0265397 A1* 10/2012 Aliberti ............... B60L 11/1851
 701/34.4
2015/0054518 A1* 2/2015 Henrici .................... H04Q 9/00
 324/426

FOREIGN PATENT DOCUMENTS

| | | |
|---|---|---|
| JP | 2003-510790 A | 3/2003 |
| JP | 2006-250905 A | 9/2006 |
| JP | 2009-052974 A | 3/2009 |
| JP | 2010-133919 A | 6/2010 |
| WO | 01/24303 A1 | 4/2001 |

* cited by examiner

| |
|---|
| BATTERY'S CUMULATIVE TIME OF USE |
| HISTORY OF BATTERY IN TEMPERATURE PER UNIT TIME |
| HISTORY OF BATTERY'S MAXIMUM VALUE IN TEMPERATURE WITHIN UNIT TIME |
| HISTORY OF CURRENT CHARGED/DISCHARGED WITHIN UNIT TIME |
| TOTAL AMOUNT OF ELECTRIC POWER DISCHARGED |
| HISTORY OF SOC PER UNIT TIME |
| HISTORY OF DIFFERENCE BETWEEN MAXIMUM AND MINIMUM VALUES IN SOC WITHIN UNIT TIME |
| HISTORY OF SOC OBSERVED IMMEDIATELY AFTER IGNITION SWITCH IS TURNED ON |
| HISTORY OF IGNITION SWITCH'S OFF-TIME |
| HOW MANY TIMES BATTERY'S VOLTAGE IS SMALLER THAN LOWER LIMIT VALUE |
| HISTORY OF DIFFERENCE BETWEEN SOC OBSERVED WHEN PLUG-IN CHARGING IS STARTED AND SOC OBSERVED WHEN PLUG-IN CHARGING ENDS |
| HISTORY OF HOW LONG IN TIME EV TRAVELLING MODE IS CONTINUOUSLY APPLIED |
| HISTORY OF HOW LONG IN TIME HV TRAVELLING MODE IS CONTINUOUSLY APPLIED |

BATTERY SYSTEM

This nonprovisional application is based on Japanese Patent Application No. 2014-027562 filed on Feb. 17, 2014, with the Japan Patent Office, the entire contents of which are hereby incorporated by reference.

BACKGROUND OF THE INVENTION

Field of the Invention

The present invention relates to a battery system, and for example to a battery system mounted in a vehicle.

Description of the Background Art

Japanese Patent Laying-Open No. 2006-250905 discloses using battery information stored in a database to calculate a battery's degradation factor which is in turn used to estimate a capacity that the battery can provide to store electric power, i.e., battery capacity.

SUMMARY OF THE INVENTION

However, when the battery has moisture having intruded therein from the atmosphere or the like, the battery's lithium ions react with the moisture and are thus consumed, resulting in reduced battery capacity. As a result, the estimated value in battery capacity calculated as described in Japanese Patent Laying-Open No. 2006-250905 has a deviation from the actual battery capacity, resulting in impaired estimation accuracy.

Accordingly, an object of the present invention is to provide a battery system allowing a battery having moisture having intruded therein to nonetheless have its battery capacity estimated without impaired accuracy.

The present battery system comprises: a battery; a battery capacity estimation unit that estimates a capacity of the battery from information regarding a use history of the battery; a moisture intrusion estimation unit that estimates an amount of moisture intruding into the battery; and a battery capacity correction unit that corrects the estimated capacity of the battery, based on the estimated amount of moisture intruding into the battery.

How much amount of moisture the battery has having intruded therein can thus be considered in obtaining how much battery capacity it has, and when the battery has moisture having intruded therein, the battery can nonetheless have its battery capacity estimated without impaired accuracy.

Preferably, the moisture intrusion estimation unit refers to a history of the battery in temperature to estimate the amount of moisture intruding into the battery.

The battery's temperature data can be relatively easily obtained, which can help to estimate how much amount of moisture the battery has having intruded therein.

Preferably, the moisture intrusion estimation unit refers to information regarding the use history of the battery to obtain a moisture intrusion rate of the moisture intruding into the battery and a time of use of the battery versus each temperature at which the battery is used, and the moisture intrusion estimation unit calculates a product of the moisture intrusion rate and the time of use of the battery for any temperature at which the battery is used, and the moisture intrusion estimation unit adds such calculated products together to obtain a total sum of the products to estimate the amount of moisture intruding into the battery.

How much amount of moisture the battery has having intruded therein can thus be obtained with high accuracy.

Preferably, the battery capacity correction unit refers to a predetermined relationship between an amount of moisture intruding into the battery and an amount of capacity degraded, to obtain an amount of capacity degraded corresponding to the amount of moisture intruding into the battery as estimated by the moisture intrusion estimation unit, and the battery capacity correction unit uses the amount of capacity degraded, to correct the battery capacity estimated in the battery capacity estimation unit.

Thus, when how much amount of moisture the battery has having intruded therein is considered in obtaining how much battery capacity it has, the battery capacity can be obtained with high accuracy.

Preferably, the battery system further comprises a control unit that modifies an input/output limit value of the battery when the corrected capacity of the battery is equal to or smaller than a threshold value.

This can protect the battery against further degradation.

Preferably, the battery system further comprises a notification unit that indicates information indicating that the battery has a small battery capacity when the corrected capacity of the battery is equal to or smaller than a threshold value.

This allows a driver to for example have a dealer exchange the battery with another timely before its lifetime rapidly decreases.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will hereinafter be described in embodiments with reference to the drawings.

Hereinafter reference will be made to the drawings to describe the present invention in embodiments more specifically. In the figures, identical or corresponding components are identically denoted, and will not be described repeatedly.

First Embodiment

Figure 1:
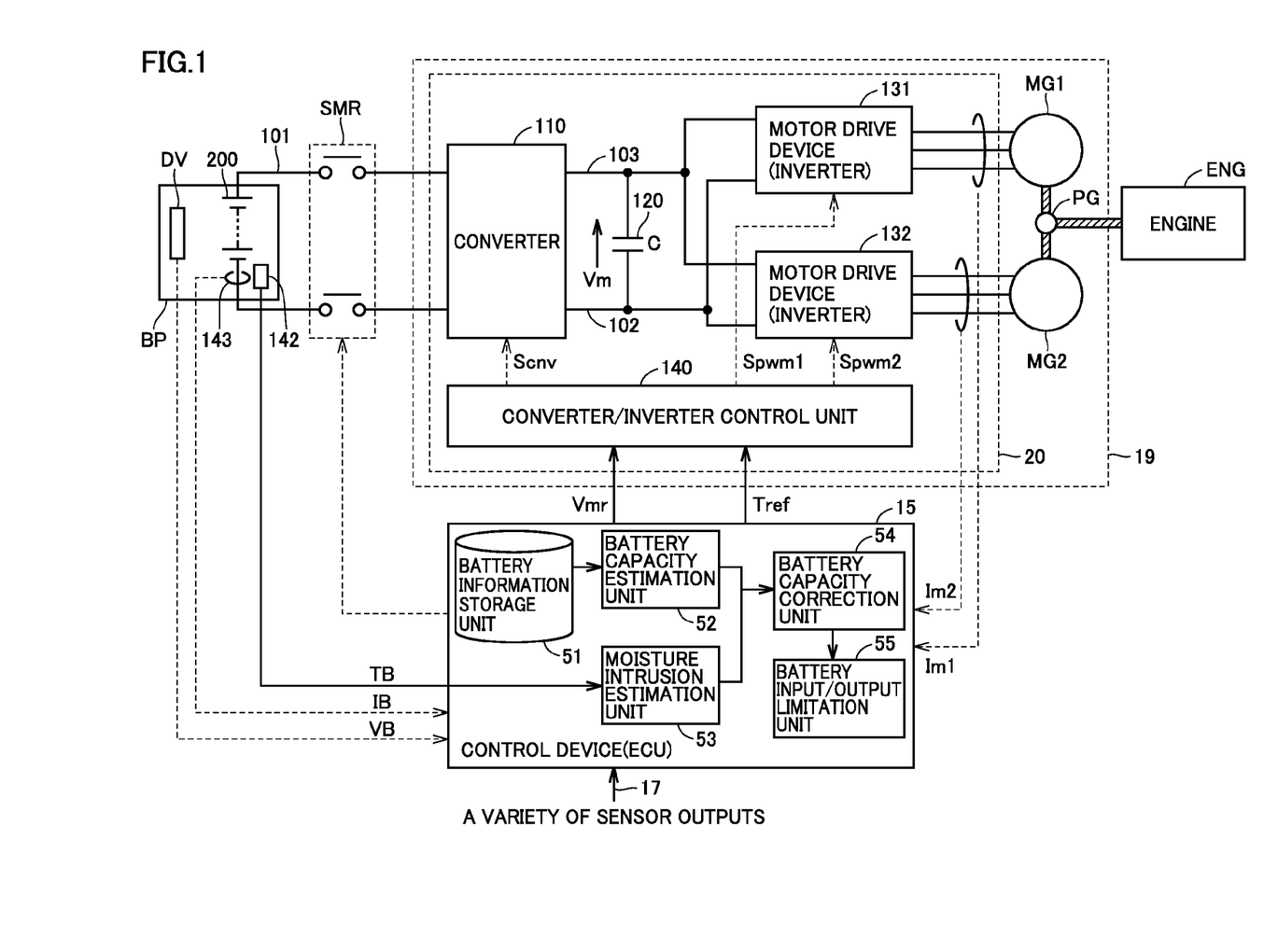
FIG. 1 is a block diagram showing a configuration of a vehicle having a battery system mounted therein according to a first embodiment of the present invention.

FIG. 1 is a block diagram showing a configuration of a vehicle having a battery system mounted therein according to a first embodiment of the present invention.

With reference to FIG. 1, a hybrid vehicle includes a battery pack BP, a system main relay SMR, a charge and discharge unit 19, an engine ENG, and a control device 15.

Charge and discharge unit 19 charges and discharges battery 200. Charge and discharge unit 19 includes a power control unit (PCU) 20, motor generators MG1 and MG2, and a power split device PG.

Battery pack BP includes a battery 200, a voltage monitoring unit DV, a temperature sensor 142, and a current sensor 143. Battery 200 includes a plurality of battery cells connected in series.

Battery 200 is a direct current (dc) power supply, and for example includes a rechargeable battery, such as a nickel metal hydride battery and a lithium ion battery. Battery 200 supplies dc voltage to PCU 20 and is also charged with dc voltage provided from PCU 20.

Voltage monitoring unit DV detects dc voltage VB of battery 200. Temperature sensor 142 senses temperature TB of battery 200. Current sensor 143 senses a current IB passing through battery 200. Temperature TB, current IB, and dc voltage VB are output towards control device (or ECU) 15.

Control device 15 receives an output 17 from a variety of sensors indicating a driving condition and a vehicular condition. Sensor output 17 includes an accelerator pedal position that is sensed by a position sensor disposed at the accelerator pedal and depends on how much the accelerator pedal is pressed, an output of a vehicular wheel speed sensor, and the like. Control device 15 operates in response to these sensors' outputs to generally provide a variety of control applied to the hybrid vehicle.

Engine ENG and motor generators MG1 and MG2 are mechanically coupled via power split device PG. Depending on how the hybrid vehicle is travelling, the power split device operates to allocate and couple driving force between engine ENG, motor generator MG1 and motor generator MG2 to as a result drive a driving wheel.

While motor generators MG1 and MG2 can function as an electric power generator as well as an electric motor, motor generator MG1 operates mainly as the electric power generator and motor generator MG2 operates mainly as the electric motor.

More specifically, motor generator MG1, for acceleration, is employed as an electric motor to start the engine. More specifically, motor generator MG1 receives electric power from battery 200 to be driven as the electric motor to rotate the crankshaft to start the engine.

Furthermore, once the engine has been started, motor generator MG1 is rotated by the driving force of the engine transmitted via power split device PG to generate electric power.

Motor generator MG2 is driven by at least one of the electric power stored in battery 200 and the electric power generated by motor generator MG1. Motor generator MG2 provides driving force, which is in turn transmitted via a differential gear and/or the like to the drive shaft. Motor generator MG2 thus assists the engine to cause the vehicle to travel, or provides driving force to alone cause the vehicle to travel.

Furthermore, when the vehicle is regeneratively braked, motor generator MG2 is driven by the driving wheel's torque to operate as an electric power generator. Motor generator MG2 thus regenerates electric power which is in turn charged via PCU 20 to battery 200.

When motor generators MG1 and MG2 are in a power running operation, PCU 20 follows a control instruction received from control device 15 to boost dc voltage output from battery 200 and also convert the boosted dc voltage into alternate current (ac) voltage to control and thus drive motor generators MG1 and MG2 included in a motive power output device 30.

Furthermore, when motor generators MG1 and MG2 are in a regenerative braking operation, PCU 20 follows a control instruction received from control device 15 to convert the ac voltage that motor generators MG1 and MG2 generate into dc voltage to charge battery 200.

Thus, the hybrid vehicle has battery 200, PCU 20, and a portion of control device 15 that controls PCU 20 to configure a power supply device to drivably control motor generators MG1 and MG2.

PCU 20 includes a converter 110, a smoothing capacitor 120, motor drive devices 131 and 132 associated with motor generators MG1 and MG2, respectively, and a converter/inverter control unit 140. In the present embodiment, motor generators MG1 and MG2 that are ac motors are drivably controlled, and accordingly, motor drive devices 131, 132 are configured as inverters. Hereinafter, motor drive devices 131 and 132 will be referred to as inverters 131 and 132.

Control device 15 operates in response to a variety of sensor outputs 17 to consider an allocation of an output for engine ENG and accordingly determine a torque that motor generators MG1 and MG2 are required to provide. Furthermore, control device 15 calculates an optimal motor operating voltage depending on how motor generators MG1 and MG2 currently operate.

Furthermore, control device 15 generates a voltage control value Vmr for motor operating voltage Vm, and a torque control value Tref for motor generators MG1 and MG2, based on the required torque and the optimal motor operating voltage and on dc voltage VB detected by voltage monitoring unit DV. Voltage control value Vmr and torque control value Tref are provided to converter/inverter control unit 140.

Control device 15 generates voltage control value Vmr for motor operating voltage Vm and torque control value Tref for motor generators MG1 and MG2 so that electric power required when motor generators MG1 and MG2 are in the power running operation may not exceed tolerable output electric power WOUT.

Control device 15 generates voltage control value Vmr for motor operating voltage Vm and torque control value Tref for motor generators MG1 and MG2 so that electric power generated when motor generators MG1 and MG2 are regeneratively braked may not exceed tolerable input electric power WIN.

Converter/inverter control unit 140 follows voltage control value Vmr received from control device 15 to generate a converter control signal Scnv to control an operation of converter 110. Furthermore, converter/inverter control unit 140 follows torque control value Tref received from control device 15 to generate inverter control signals Spwm1 and Spwm2 to control an operation of inverters 131 and 132, respectively.

Control device 15 includes a battery information storage unit 51, a battery capacity estimation unit 52, a moisture intrusion estimation unit 53, a battery capacity correction unit 54, and a battery input/output limitation unit 55.

Battery information storage unit 51 stores information regarding a use history of battery 200.

Battery capacity estimation unit 52 refers to the information regarding battery 200's use history to estimate the battery in battery capacity.

Moisture intrusion estimation unit 53 estimates an amount of moisture intruding into battery 200.

Battery capacity correction unit 54 uses the amount of intruding moisture, as estimated in moisture intrusion estimation unit 53, to correct the battery capacity estimated in battery capacity estimation unit 52.

Battery input/output limitation unit 55 decreases battery 200's tolerable output electric power Wout and tolerable input electric power Win when the corrected battery capacity is equal to or smaller than a threshold value.

Figure 2:
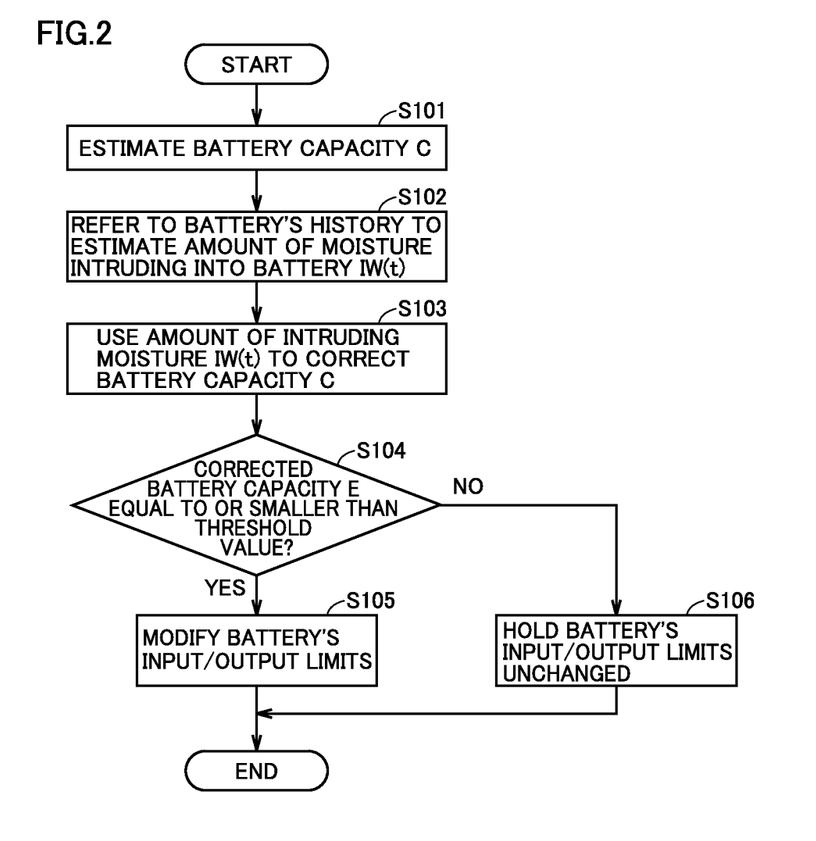
FIG. 2 is a flowchart of an operation procedure according to the first embodiment.

FIG. 2 is a flowchart of an operation procedure according to the first embodiment.

In Step S101, battery capacity estimation unit 52 estimates a battery capacity C based on information stored in battery information storage unit 51 regarding the battery's use history. More specifically, battery capacity estimation unit 52 estimates battery capacity C, as follows:

$$y = 1 - a \times tu^{1/2} \qquad (1), \text{ and}$$

$$C = C0 \times y \qquad (2),$$

where a represents a degradation factor determined by under what condition battery 200 is used, tu represent a cumulative time of use of battery 200, y represents a capacity maintenance ratio, and C0 represents an initial capacity of battery 200.

Figure 3:
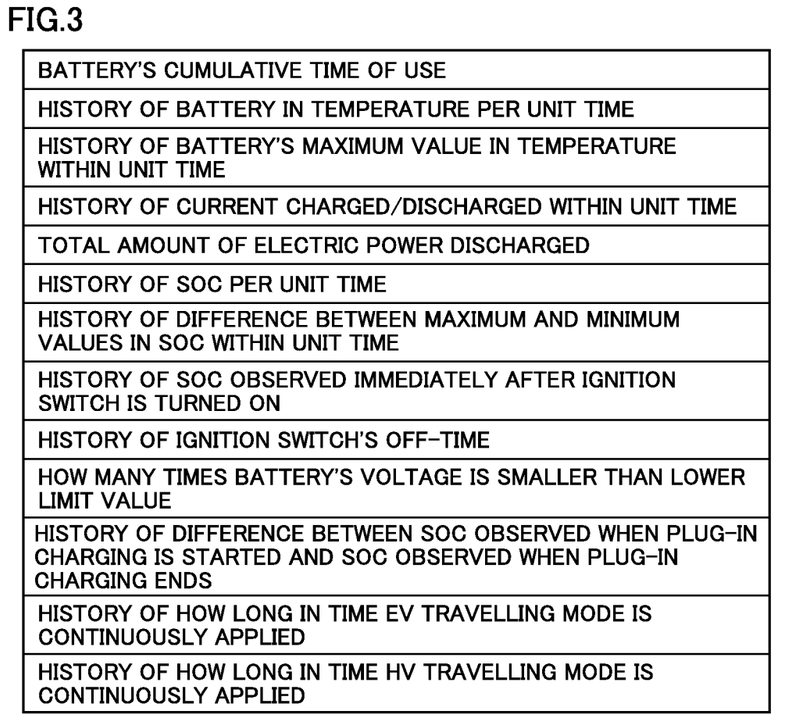
FIG. 3 shows an example of information regarding a battery's use history stored in a battery information storage unit.

FIG. 3 shows an example of information stored in battery information storage unit 51 regarding the battery's use history.

Battery 200's cumulative time of use tu is that stored in battery information storage unit 51. Degradation factor a can be set by at least one piece of information stored in battery information storage unit 51. For example, degradation factor a can be set that has such features as follows:

Degradation factor a is increased to be larger when a history indicates that the battery attains a predetermined value of temperature or higher more frequently per unit time. Degradation factor a is increased to be larger when a history indicates that the battery attains a maximum temperature value equal to or larger than a predetermined value more frequently within a unit time. Degradation factor a is increased to be larger when a history indicates that the battery is charged/discharged with a current of a predetermined value or larger more frequently within a unit time. Degradation factor a is increased to be larger when the battery discharges larger amounts of electric power in total. Degradation factor a is increased to be larger when a history indicates that the battery has larger state of charge (SOC) per unit time. Degradation factor a is increased to be larger when a history indicates that the battery has an SOC with maximum and minimum values having a difference therebetween equal to or larger than a predetermined value more frequently within a unit time. Degradation factor a is increased to be larger when a history indicates that immediately after the ignition switch is turned on the battery has an SOC equal to or smaller than a predetermined value more frequently. Degradation factor a is increased to be larger when a history indicates that the ignition switch is turned off for a period of time of a predetermined value less frequently. Degradation factor a is increased to be larger when the battery's voltage is smaller than a lower limit value more frequently. Degradation factor a is increased to be larger when a history indicates larger differences between an SOC observed when plug-in charging is started and that observed when plug-in charging ends. Degradation factor a is increased to be larger when a history indicates that an EV travelling mode is continuously applied for longer periods of time. Degradation factor a is increased to be larger when a history indicates that an HV travelling mode is continuously applied for shorter periods of time.

Figure 4:
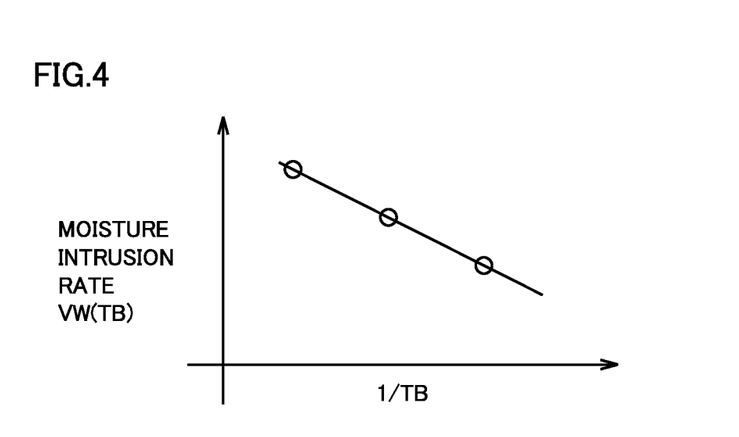
FIG. 4 shows a relationship between temperature TB of a battery 200 and a rate VW of moisture intruding into battery 200.

In Step S102, moisture intrusion estimation unit 53 refers to battery 200's temperature history to estimate an amount of moisture intruding into battery 200. More specifically, moisture intrusion estimation unit 53 estimates the amount of intruding moisture through the following procedure:

Moisture intrusion estimation unit 53 refers to the battery's temperature history up to a current time t, or the battery's temperature history per unit time, as stored in battery information storage unit 51, to obtain a moisture intrusion rate VW(TB) of moisture intruding into battery 200 versus each temperature TB at which battery 200 was used. FIG. 4 shows a relationship between temperature TB of battery 200, and moisture intrusion rate VW of the moisture intruding into battery 200. As shown in FIG. 4, 1/TB and VW are represented by a linear expression (Arrhenius' plot). Moisture intrusion estimation unit 53 obtains from the relationship of FIG. 4 moisture intrusion rate VW(TB) of moisture intruding into battery 200 versus each temperature TB.

Figure 5:
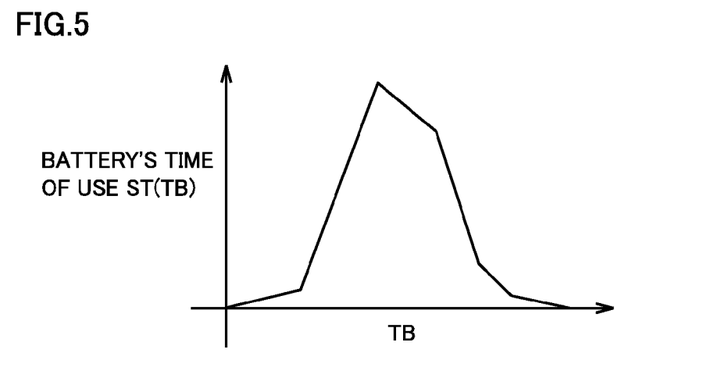
FIG. 5 shows a relationship between temperature TB of battery 200, and the battery's time of use ST for each temperature in the battery.

Furthermore, moisture intrusion estimation unit 53 refers to the battery's temperature history up to current time t to obtain time of use ST(TB) of battery 200 for each temperature TB at which battery 200 was used. FIG. 5 shows a relationship with time of use ST of battery 200 at temperature TB of battery 200.

As indicated by an expression (3), moisture intrusion estimation unit 53 calculates a product of moisture intrusion rate VW(TB) at temperature TB and time of use ST(TB) of battery 200 for any temperature at which battery 200 was used, and moisture intrusion estimation unit 53 adds such calculated products together to obtain a total sum thereof to obtain for current time t an amount of moisture having intruded into the battery IW(t).

$$IW(t) = \Sigma VW(TB) \times ST(TB) \qquad (3),$$

where Σ means varying TB and thus obtaining the total sum.

Figure 6:
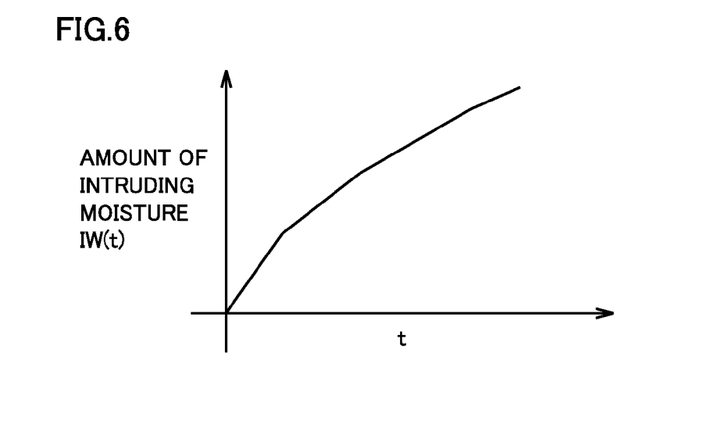
FIG. 6 shows how moisture intruding into battery 200 varies in amount with time.

FIG. 6 shows how amount of intruding moisture IW(t) varies with time.

Figure 7:
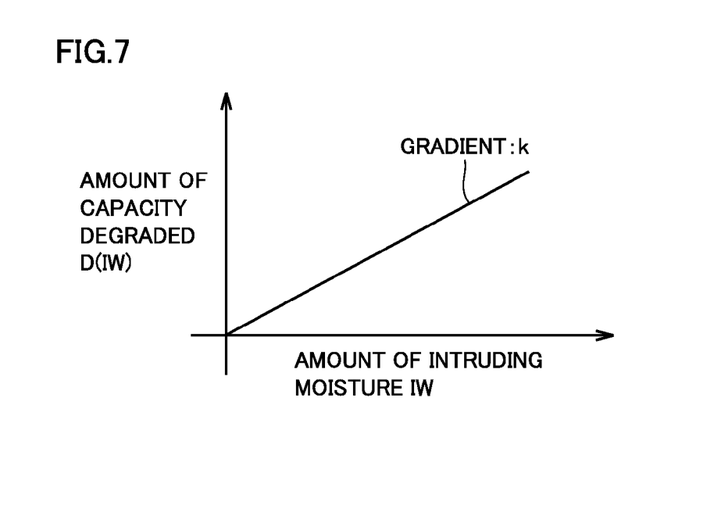
FIG. 7 shows a relationship between an amount of intruding moisture IW and an amount of capacity degraded D.

In step S103, battery capacity correction unit 54 uses amount of intruding moisture IW(t), as estimated in moisture intrusion estimation unit 53, to correct battery capacity C estimated in battery capacity estimation unit 52. More specifically, battery capacity correction unit 54 refers to a predetermined relationship between amount of intruding moisture IW and an amount of capacity degraded D, as indicated in FIG. 7, to obtain amount of capacity degraded D corresponding to amount of intruding moisture IW as estimated in moisture intrusion estimation unit 53. The FIG. 7 example determines that amount of intruding moisture IW multiplied by a gradient k (a constant) is amount of capacity degraded D. Battery capacity correction unit 54 subtracts amount of capacity degraded D from battery capacity C estimated in battery capacity estimation unit 52 to calculate a corrected battery capacity E, i.e., E=C−D.

In Step S104, when corrected battery capacity E is equal to or smaller than a threshold value, the control proceeds to Step S105, whereas when corrected battery capacity E exceeds the threshold value, the control proceeds to Step S106.

In Step S105, battery input/output limitation unit 55 decreases battery 200's tolerable output electric power Wout and tolerable input electric power Win to a predetermined value.

In Step S106, battery input/output limitation unit 55 does not modify battery 200's tolerable output electric power Wout and tolerable input electric power Win.

Thus the present embodiment allows a battery having moisture having intruded therein to nonetheless have its battery capacity estimated without impaired accuracy. Furthermore, when an estimated battery capacity is equal to or smaller than a threshold value, the battery's tolerable output electric power and tolerable input electric power can be decreased to protect the battery against further degradation.

Second Embodiment

Figure 8:
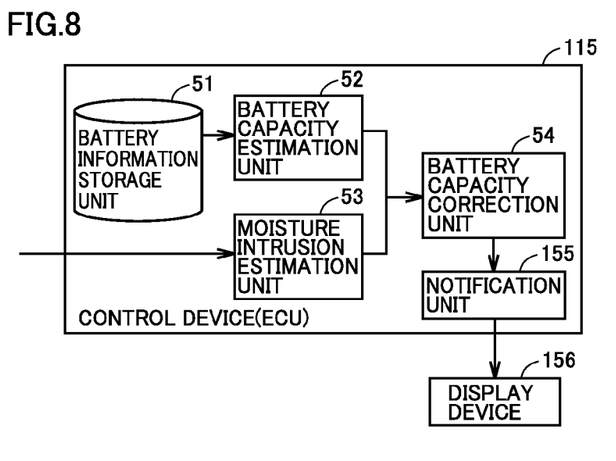
FIG. 8 shows a configuration of a control device (or ECU) of a second embodiment.

FIG. 8 shows a configuration of a control device (or ECU) 115 of a second embodiment.

The FIG. 8 control device 115 differs from the FIG. 1 control device 15 in that the former excludes battery input/output limitation unit 55 and instead includes a notification unit 155.

A display device 156 is for example a liquid crystal display.

When a corrected battery capacity is equal to or smaller than the threshold value, notification unit 155 provides information indicating that the battery has a small battery capacity, and display device 156 displays the information.

Figure 9:
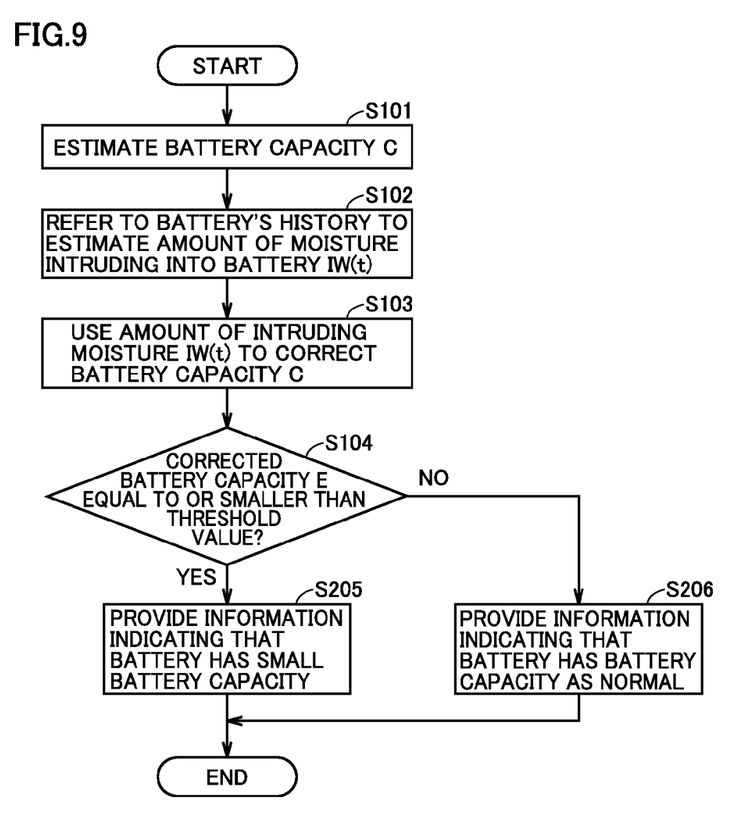
FIG. 9 is a flowchart of an operation procedure according to the second embodiment.

FIG. 9 is a flowchart of an operation procedure according to the second embodiment.

The FIG. 9 flowchart differs from the FIG. 2 flowchart in that the former excludes Step S105 and Step S106 and instead includes Step S205 and Step S206.

In step S205, notification unit 155 provides information indicating that the battery has a small battery capacity, and display device 156 displays the information. For example, display device 156 displays such a message as "Battery has small battery capacity. Battery can no further be used. Please contact dealer to have them diagnose battery."

In step S206, notification unit 155 provides information indicating that the battery has battery capacity as normal, and display device 156 displays the information. For example, display device 156 displays such a message as "Battery has battery capacity as normal. Battery can further be used."

Thus the present embodiment, as well as the first embodiment, allows a battery having moisture having intruded therein to nonetheless have its battery capacity estimated without impaired accuracy. Furthermore, when an estimated battery capacity is equal to or smaller than a threshold value, information is displayed indicating that the battery has a small battery capacity, and this allows the driver to for example exchange the battery with another before its lifetime rapidly decreases.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A battery system comprising:
a battery;
a battery capacity estimation unit that estimates a capacity of said battery from information regarding a use history of said battery;
a moisture intrusion estimation unit that estimates an amount of moisture intruding into said battery;
a battery capacity correction unit that corrects said estimated capacity of said battery, based on said estimated amount of moisture intruding into said battery,
wherein the capacity of said battery represents an amount of electric power that the battery can store, and
wherein said battery capacity estimation unit is programmed to estimate the capacity C of said battery based on expressions (A1) and (A2);

$$y = 1 - a \times t u^{1/2} \quad \text{(A1), and}$$

$$C = C0 \times y \quad \text{(A2),}$$

where a represents a degradation factor determined by under what condition said battery is used, to represents a cumulative time of use of said battery, y represents a capacity maintenance ratio, and C0 represents an initial capacity of said battery.

2. The battery system according to claim 1, wherein said moisture intrusion estimation unit refers to a history of said battery in temperature to estimate said amount of moisture intruding into said battery.

3. A battery system comprising:
a battery;
a battery capacity estimation unit that estimates a capacity of said battery from information regarding a use history of said battery;
a moisture intrusion estimation unit that estimates an amount of moisture intruding into said battery; and
a battery capacity correction unit that corrects said estimated capacity of said battery, based on said estimated amount of moisture intruding into said battery;
wherein the capacity of said battery represents an amount of electric power that the battery can store,
said moisture intrusion estimation unit is programmed to obtain a moisture intrusion rate of said moisture intruding into said battery and a time of use of said battery versus each temperature at which said battery is used based on information regarding said use history of said battery; and
said moisture intrusion estimation unit is programmed to calculate a product of said moisture intrusion rate and said time of use of said battery for any temperature at which said battery is used, and said moisture intrusion estimation unit is programmed to add such calculated products together to obtain a total sum of said products to estimate said amount of moisture intruding into said battery.

4. A battery system comprising:
a battery;
a battery capacity estimation unit that estimates a capacity of said battery from information regarding a use history of said battery;
a moisture intrusion estimation unit that estimates an amount of moisture intruding into said battery;
a battery capacity correction unit that corrects said estimated capacity of said battery, based on said estimated amount of moisture intruding into said battery,
wherein the capacity of said battery represents an amount of electric power that the battery can store, and
wherein said battery capacity correction unit is programmed to obtain an amount of capacity degraded corresponding to an amount of moisture intruding into said battery as estimated by said moisture intrusion estimation unit based on a predetermined relationship between said amount of moisture intruding into said battery and an amount of capacity degraded, and said battery capacity correction unit is programmed to correct said battery capacity estimated in said battery capacity estimation unit based on said amount of capacity degraded.

5. The battery system according to claim 1, further comprising a control unit that modifies an input/output limit value of said battery when said corrected capacity of said battery is equal to or smaller than a threshold value.

6. The battery system according to claim 1, further comprising a notification unit that indicates information indicating that said battery has a small battery capacity when said corrected capacity of said battery is equal to or smaller than a threshold value.

7. The battery system according to claim 3, wherein said battery capacity correction unit is programmed to obtain an amount of capacity degraded corresponding to an amount of moisture intruding into said battery as estimated by said moisture intrusion estimation unit based on a predetermined relationship between said amount of moisture intruding into said battery and an amount of capacity degraded, and said battery capacity correction unit is programmed to correct said battery capacity estimated in said battery capacity estimation unit based on said amount of capacity degraded.

* * * * *